US012771885B2

(12) United States Patent
Patel

(10) Patent No.: US 12,771,885 B2
(45) Date of Patent: Oct. 20, 2026

(54) METHOD AND PROCESSING UNIT FOR ENABLING PERSONALIZED RECORDING OF CONTENT IN AN IMMERSIVE ENVIRONMENT

(71) Applicant: ZEALITY INC, Pleasanton, CA (US)

(72) Inventor: Dipak Mahendra Patel, Pleasanton, CA (US)

(73) Assignee: ZEALITY INC

( * ) Notice: Subject to any disclaimer, the term of this patent is extended or adjusted under 35 U.S.C. 154(b) by 92 days.

(21) Appl. No.: 18/581,419

(22) Filed: Feb. 20, 2024

(65) Prior Publication Data

US 2025/0267313 A1 Aug. 21, 2025

(51) Int. Cl.
*H04N 21/234* (2011.01)
*H04N 21/845* (2011.01)

(52) U.S. Cl.
CPC ..... *H04N 21/23412* (2013.01); *H04N 21/845* (2013.01)

(58) Field of Classification Search
CPC ....................... H04N 21/23412; H04N 21/845
See application file for complete search history.

(56) References Cited

U.S. PATENT DOCUMENTS

| | | | |
|---|---|---|---|
| 8,953,022 B2 | 2/2015 | McArdle et al. | |
| 9,900,626 B2 | 2/2018 | Jayaram et al. | |
| 10,861,245 B2 | 12/2020 | Hariton | |
| 11,263,815 B2 | 3/2022 | Alam et al. | |
| 11,405,657 B1 * | 8/2022 | Perumalla | A63F 13/497 |
| 11,682,178 B2 | 6/2023 | Sears et al. | |
| 2018/0014037 A1 * | 1/2018 | Venkatraman | H04N 21/4532 |
| 2023/0154124 A1 | 5/2023 | Chen et al. | |

* cited by examiner

*Primary Examiner* — Stephen S Hong
*Assistant Examiner* — Darrin Hope
(74) *Attorney, Agent, or Firm* — Riyon Rae Harding

(57) ABSTRACT

The present invention discloses to enable personalized recording of content in an immersive environment. The method includes segmenting content at instances during live rendering of the content in immersive environment with participants, to obtain segments of content for each instant amongst the instances. The content is segmented based on categories of displayed objects. Further, first perspective of participant is selected for each segment at an instant. The first perspective is selected based on at least one of contextual data, preference of a user, behavior and inputs. Further, the first perspective of segments is recorded during the live rendering. Upon end of the live rendering, the personalized recorded version of the content is created for the user using the first perspective of the plurality of segments.

18 Claims, 9 Drawing Sheets

METHOD AND PROCESSING UNIT FOR ENABLING PERSONALIZED RECORDING OF CONTENT IN AN IMMERSIVE ENVIRONMENT

FIELD OF THE PRESENT INVENTION

Embodiments of the present invention generally relate to enabling access to an immersive content to a user in an immersive environment. In particular, embodiments of the present invention relate to a method and a processing unit for enabling personalized recording of content to a user in the immersive environment.

BACKGROUND OF THE DISCLOSURE

Live content rendered to users in an immersive environment may be pre-defined. In some scenarios, viewers of the content would not have a control over the content. Further, some of the existing systems provision a user to control live content and personalize said live content when viewing. Recording, downloading, and sharing personalized content in immersive environments are taught in some of the existing prior arts, especially in the context of immersive environments. Moreover, systems exist that leverage VR personalization based on user behavior, historical interactions, and perceptual feedback within immersive environments.

U.S. Pat. No. 11,263,815B2 focuses on adapting VR or AR content for learning based on a user's interests and knowledge level, utilizing a personalization engine that analyzes user behavior and preferences. Another U.S. Pat. No. 9,900,626B2 describes a system for recording video productions from panoramic video feeds and distributing personalized VR streams to multiple clients on a local network. U.S. Pat. No. 11,682,178B2 addresses changing user perception in a shared artificial reality environment based on user preferences and a relative coordinate system. U.S. Pat. No. 10,861,245B2 discusses generating and facilitating access to personalized augmented renderings in augmented reality environments, allowing users to modify their representations. U.S. Pat. No. 8,953,022B2 describes a method for sharing user-generated virtual and augmented reality scenes, adapting the displayable scene based on real and user orientation changes for a uniform user experience.

The existing systems and techniques may reveal aspects of personalized content consumption in immersive environments. However, in a scenario with multiple users, the existing arts restrict the user to personalize based on the user's perspective only. Hence, there exists a requirement for a technique and processing unit that enables the user to personalize the recording of the content by considering the perspective of other users as well.

The information disclosed in this background of the disclosure section is only for enhancement of understanding of the general background of the disclosure and should not be taken as an acknowledgment or any form of suggestion that this information forms existing information already known to a person skilled in the art.

BRIEF SUMMARY OF THE DISCLOSURE

A method, a processing unit, and a non-transitory computer-readable medium for enabling personalized recording of a content in an immersive environment. The method includes to segment a content at plurality of instances during live rendering of the content in an immersive environment with plurality of participants, to obtain plurality of segments of the content for each instant amongst the plurality of instances. The content is segmented based on categories of objects displayed within the immersive environment. Further, a first perspective of a participant from the plurality of participants is selected for each segment amongst the plurality of segments at an instant from the plurality of instances. The first perspective is selected based on at least one of contextual data associated with the immersive environment, preference of a user amongst the plurality of participants, behavior, and inputs of the user within the immersive environment during the live rendering. Further, the first perspective of the plurality of segments is recorded during the live rendering. Upon end of the live rendering, the personalized recorded version of the content is created for the user using the first perspective of the plurality of segments.

In a non-limiting embodiment, upon creating the personalized recorded version, the present invention further includes to enable access to the user for at least one of downloading and sharing the personalized recorded version.

In a non-limiting embodiment, the first perspective of the plurality of segments is recorded to output a portion of a personalized recorded version of the content at the instant of time.

In a non-limiting embodiment, creating the personalized recorded version comprises to concatenate the first perspective of each segment from the plurality of segments, to obtain a portion of the personalized recorded version at the instant associated with the plurality of segments and combine portions obtained for each instant from the plurality of instances, to output the personalized recorded version of the content.

In a non-limiting embodiment, the present invention further comprises, during live rendering of the content, to generate one or more real-time recommendations for at least one portion amongst the portions of the personalized recorded version, based on the preferences of the user and dynamically display the one or more real-time recommendations along with the content to the user. The one or more real-time recommendations prompt the user to select a second perspective for at least one segment amongst the plurality of segments of the at least one portion.

In a non-limiting embodiment, when the user selects the second perspective, the present invention includes to replace the first perspective of the at least one segment with the second perspective, for the recording.

The features and advantages of the subject matter hereof will become more apparent in light of the following detailed description of selected embodiments, as illustrated in the accompanying FIGURES. As one of ordinary skill in the art will realize, the subject matter disclosed herein is capable of modifications in various respects, all without departing from the scope of the subject matter. Accordingly, the drawings and the description are to be regarded as illustrative.

BRIEF DESCRIPTION OF THE DRAWINGS

The present subject matter will now be described in detail with reference to the drawings, which are provided as illustrative examples of the subject matter to enable those skilled in the art to practice the subject matter. It will be noted that throughout the appended drawings, features are identified by reference numerals. Notably, the FIGURES and examples are not meant to limit the scope of the present subject matter to a single embodiment, but other embodiments are possible by way of interchange of some or all of the described or illustrated elements and, further, wherein.

DETAILED DESCRIPTION OF THE EMBODIMENTS

Figure 1:
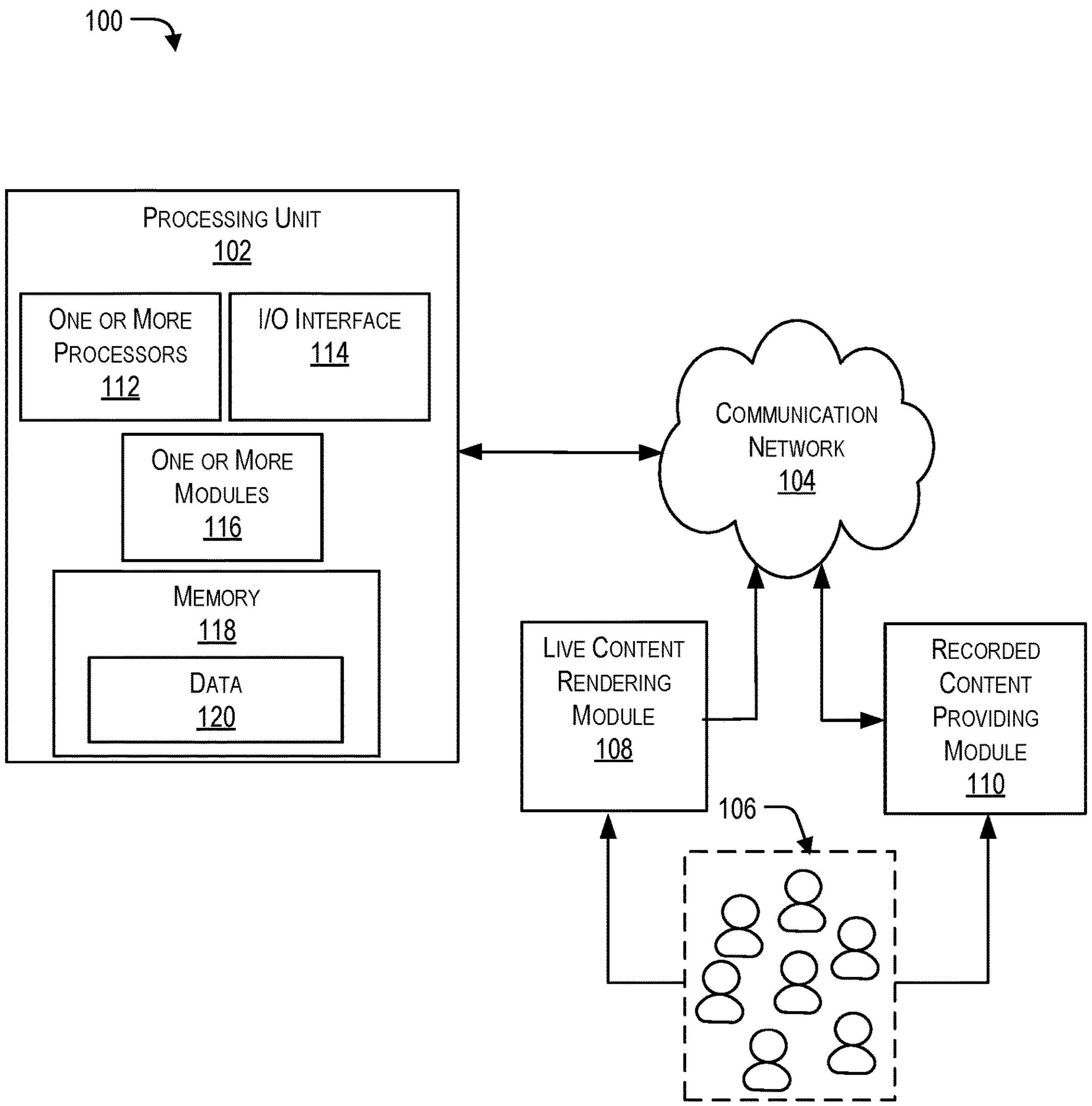
FIG. 1 illustrates an exemplary environment with a processing unit for enabling personalized recording of a content in an immersive environment, in accordance with an embodiment of the present invention.

The detailed description set forth below in connection with the appended drawings is intended as a description of exemplary embodiments in which the presently disclosed invention can be practiced. The term "exemplary" used throughout this description means "serving as an example, instance, or illustration," and should not necessarily be construed as preferred or advantageous over other embodiments. The detailed description includes specific details to provide a thorough understanding of the presently disclosed invention. However, it will be apparent to those skilled in the art that the presently disclosed invention may be practiced without these specific details. In some instances, well-known structures and devices are shown in block diagram form in order to avoid obscuring the concepts of the presently disclosed invention.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and/or firmware.

Embodiments of the present invention may be provided as a computer program product, which may include a non-transitory, machine-readable storage medium tangibly embodying thereon instructions, which may be used to program the computer (or other electronic devices) to perform a process. The machine-readable medium may include but is not limited to, fixed (hard) drives, semiconductor memories, such as Read Only Memories (ROMs), Programmable Read-Only Memories (PROMs), Random Access Memories (RAMs), Erasable PROMs (EPROMs), Electrically Erasable PROMs (EEPROMs), flash memory or other types of media/machine-readable medium suitable for storing electronic instructions (e.g., computer programming code, such as software or firmware).

Various methods described herein may be practiced by combining one or more non-transitory, machine-readable storage media containing the code according to the present invention with appropriate standard computer hardware to execute the code contained therein. An apparatus for practicing various embodiments of the present invention may involve one or more computers (or one or more processors within the single computer) and storage systems containing or having network access to a computer program(s) coded in accordance with various methods described herein, and the method steps of the invention could be accomplished by modules, routines, subroutines, or subparts of a computer program product.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context dictates otherwise. Also, as used in the description herein, the meaning of "in" includes "in" and "on" unless the context dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

It will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular name.

Embodiments of the present invention relate to a method, a processing unit, and a non-transitory computer-readable medium for enabling personalized recording of a content in an immersive environment. In the present invention, the recording, downloading, and sharing of personalized content occur in real-time. The personalization of content to be recorded considers multi-dimensional criteria, including contextual conversations, attendee's current/historical interests and behavior, and real-time notes. Moreover, in the present invention, the ability to record content is based on attendee viewpoints during contextual conversations, adapt content to match user interests and behavior, and seamlessly integrate real-time notes into the immersive experience.

FIG. 1 illustrates an exemplary environment 100 with a processing unit 102 for enabling personalized recording of a content in an immersive environment, in accordance with an embodiment of the present invention. As shown in FIG. 1, the exemplary environment 100 comprises the processing unit 102, a communication network 104, a plurality of users 106, a live content rendering module 108, and a recorded content providing module 110. The exemplary environment 100 may be the immersive environment to which the plurality of users 106 are connected. In an embodiment, the plurality of users 106 of the immersive environment may include a presenter and one or more attendees. The presenter may present content to the one or more attendees in the immersive environment. In an embodiment, the immersive environment may be any environment that renders immersive content to the plurality of users 106. The immersive environment may be but is not limited to, an extended reality environment/immersive environment, a live-telecast environment, a content streaming environment, a visual communication environment, an online gaming environment, virtual 360° view of a scene, and so on. The content may include, but is not limited to, at least one of video data, audio data, image data, text data, graphics data, and so on. Usually, the presenter may be presenting the content to the one or more attendees in such an environment. Alternatively, a host, who may not be one of the plurality of users 106, may present the content to the plurality of users 106. In an embodiment, the plurality of users 106 may also be referred to as a plurality of participants. In the present invention, a user refers to either the presenter, one of the plurality of participants, or the host. In an embodiment, the immersive environment may be a real-time communication session established amongst the plurality of users 106. The content may be but is not limited to, computer-generated data, real-time dynamically generated data, replayed data, predefined data, pre-stored data, live telecast data, and so on, that may be presented to the plurality of users 106. In an embodiment, the content may be a scene that is created by overlapping digital images of the scene. In an embodiment, the content may be sequence of scenes which are generated using multiple images. In an embodiment, a scene of a content may be combination of segments representing the content. In an embodiment, each segment may be a portion of a scene. Combination of corresponding segments may create the scene of the content. In an embodiment, each segment may be related to a category. For example, some of categories of the segments may be audio segment, static image segment, physical environment segment, user input segment, predefined data segment, and so on. Each scene of the content may include multiple segments related to one or more of the categories.

In an embodiment, the plurality of users 106 may be connected to the immersive environment via user devices. The user devices may be but are not limited to, at least one of a smartphone, a head-mounted device, smart glasses, a television, a PC, a tablet, a laptop, and so on. In an embodiment, each of the plurality of users 106 may be associated with a dedicated user device. In an alternate embodiment, two or more users amongst the plurality of users 106 may be associated with a single user device.

The proposed processing unit 102 and method may be implemented in such an environment that renders the content to the plurality of users 106. The content may be rendered to the user devices of the plurality of users 106. The processing unit 102 may be configured to enable personalized recording of a content in an immersive environment. In an embodiment, the processing unit 102 may be communicatively coupled with the user devices of the plurality of users 106. The processing unit 102 may communicate with user device associated with a user amongst the plurality of users 106 to enable the personalized recording. In an embodiment, the processing unit 102 may be implemented as a cloud-based server that is configured to communicate with each of the user devices, for enabling the personalized recording. In an alternate embodiment, the processing unit 102 may be part of a user device associated with at least one of the plurality of users 106. In such embodiment, the processing unit 102 may be configured to communicate with the user devices of each of the plurality of users 106 and may be configured to enable the personalized recording.

Further, the processing unit 102 may be in communication with each of the live content rendering module 108 and the recorded content providing module 110. In an embodiment, the live content rendering module 108 may be configured to render the live content to the plurality of users 106. The recorded content providing module 110 may be configured to provide access to the personalized recorded version of the live content.

In an embodiment, the processing unit 102 may be connected with the user devices associated with the plurality of users 106, the live content rendering module 108 and the recorded content providing module 110 via the communication network 104. The communication network 104 may include, without limitation, a direct interconnection, a Local Area Network (LAN), a Wide Area Network (WAN), a wireless network (e.g., using Wireless Application Protocol), the Internet, and the like. In an alternate embodiment, the processing unit 102 may be connected with each of said user devices, the live content rendering module 108, and the recorded content providing module 110 via a corresponding dedicated communication network (not shown in FIGS.).

Figure 2:
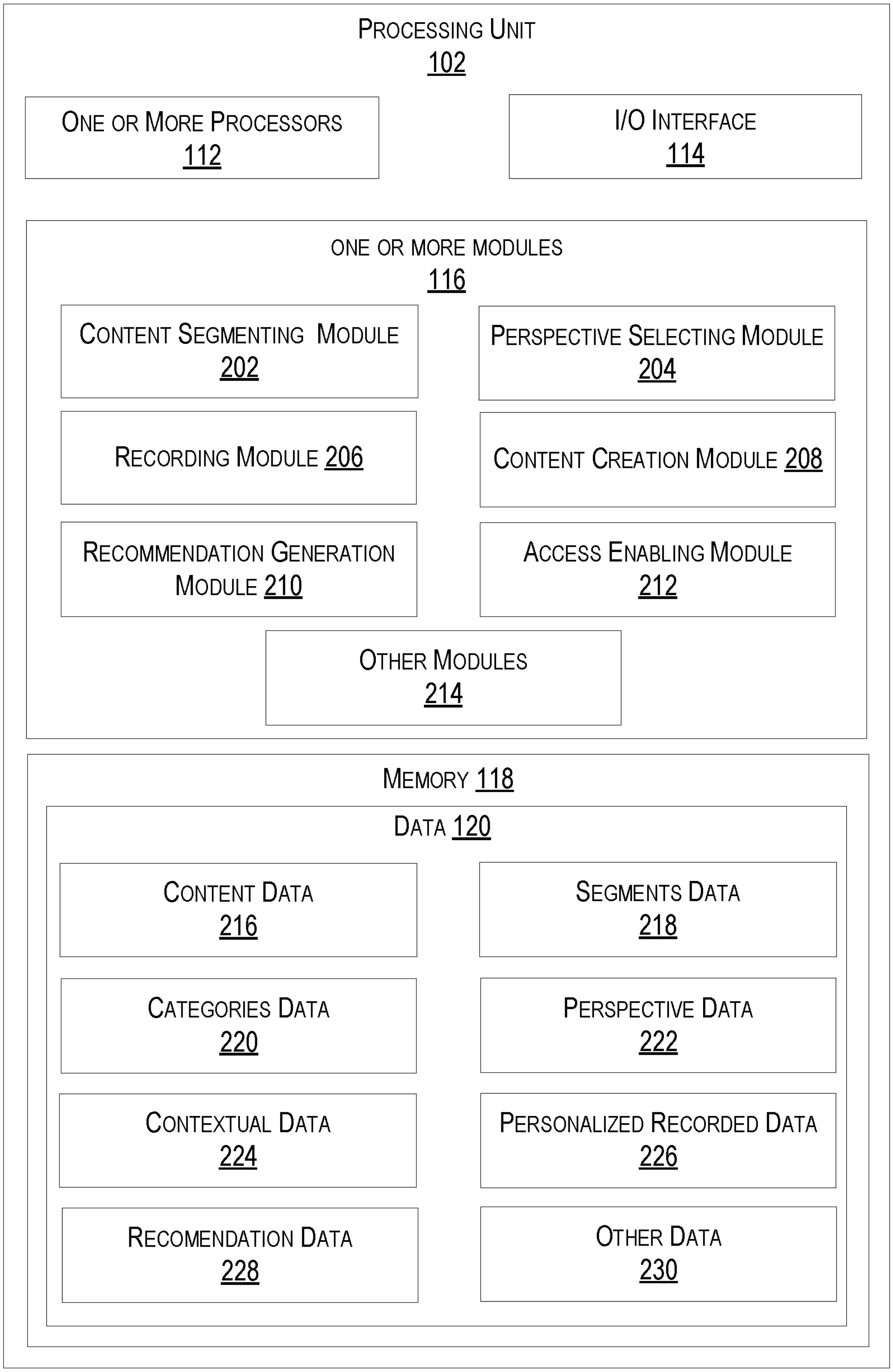
FIG. 2 illustrates a detailed block diagram showing functional modules of a processing unit for enabling personalized recording of a content in an immersive environment, in accordance with an embodiment of the present invention.

In an embodiment, for enabling personalized recording of the content in the immersive environment, the processing unit 102 may be configured to function in real-time, when the content is rendered and viewed by the plurality of users 106. FIG. 2 shows a detailed block diagram of the processing unit 102 for enabling the personalized recording of the content, in accordance with some non-limiting embodiments or aspects of the present disclosure. The processing unit 102 may include one or more processors 112, an Input/Output (I/O) interface 114, one or more modules 116, and a memory 118. In some non-limiting embodiments or aspects, the memory 118 may be communicatively coupled to the one or more processors 112. The memory 118 stores instructions, executable by the one or more processors 112, which on execution, may cause the processing unit 102 to enable the personalized recording of the content. In some non-limiting embodiments or aspects, the memory 118 may include data 120. The one or more modules 116 may be configured to perform the steps of the present disclosure using the data 120 to enable the personalized recording of the content. In some non-limiting embodiments or aspects, each of the one or more modules 116 may be a hardware unit, which may be outside the memory 118 and coupled with the processing unit 102. In some non-limiting embodiments or aspects, the processing unit 102 may be implemented in a variety of computing systems, such as a laptop computer, a desktop computer, a Personal Computer (PC), a notebook, a smartphone, a tablet, e-book readers, a server, a network server, a cloud server, and the like. In a non-limiting embodiment, each of the one or more modules 116 may be implemented with a cloud-based server, communicatively coupled with the processing unit 102.

The data 120 in the memory 118 and the one or more modules 116 of the processing unit 102 are described herein in detail. In one implementation, the one or more modules 116 may include but is not limited to, a content segmenting module 202, a perspective selecting module 204, a recording module 206, a content creation module 208, a recommendation generation module 210, an access enabling module 212 and one or more other modules 214 associated with the processing unit 102. In some non-limiting embodiments or aspects, the data 120 in the memory 118 may include content data 216 (herewith also referred to as content 216), segments data 218 (herewith also referred to as plurality of segments 218), categories data 220 (herewith also referred to as categories 220), perspective data 222, contextual data 224, personalized recorded data 226 (herewith also referred to as personalized recorded version 226), recommendation data 228 (herewith also referred to as one or more real-time recommendations 228) and other data 230 associated with the processing unit 102.

In some non-limiting embodiments or aspects, the data 120 in the memory 118 may be processed by the one or more modules 118 of the processing unit 102. In some non-limiting embodiments or aspects, the one or more modules 118 may be implemented as dedicated units and when implemented in such a manner, the modules may be configured with the functionality defined in the present disclosure to result in novel hardware. As used herein, the term module may refer to an Application Specific Integrated Circuit (ASIC), an electronic circuit, Field-Programmable Gate Arrays (FPGA), a Programmable System-on-Chip (PSoC), a combinational logic circuit, and/or other suitable components that provide the described functionality. The one or more modules 118 of the present disclosure enables monitoring of the viewing parameters of the users. The one or more modules 118 along with the data 120, may be implemented in any system for monitoring the viewing parameters of the users in the immersive environment.

Figure 3A:
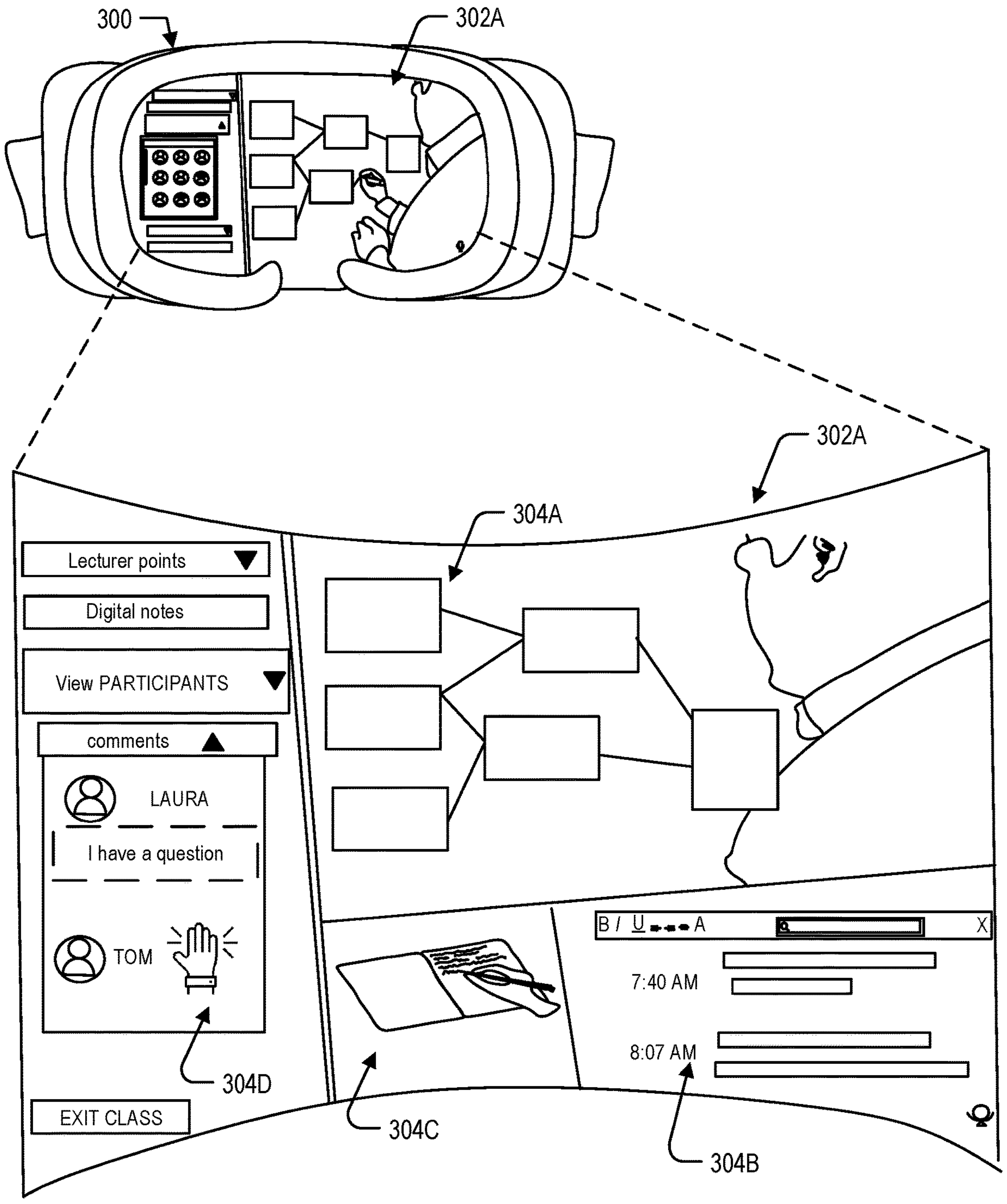
FIGS. 3A-3E show exemplary embodiments for enabling personalized recording of a content in an immersive environment, in accordance with an embodiment of the present invention.

In the immersive environment with multiple participants, there may be a need to record the content 216 that is displayed to a particular participant. Along with including the perspective of the user, such recording should also include the perspective of other participants. The present invention teaches to provision a personalized recording of the content 216 by considering perspective of other participants and contextual data associated with the user. Consider an exemplary immersive environment illustrated in FIG. 3A. The immersive environment is a classroom lecture. In an embodiment, the plurality of users 106 may include a lecturer and one or more attendees. An attendee amongst the one or more attendees may be able to view the content 216 via a user device 300. In the example illustrated in FIG. 3A, the user device 300 may be VR headset.

For enabling the personalized recording of the content 216, the content segmenting module 202 may be configured to segment the content at plurality of instances. The content 216 is segmented during live rendering of the content in the immersive environment. A scene of the content which is displayed to the user at every instant of time is segmented. By segmenting each scene, plurality of segments 218 of the scene at each instant amongst the plurality of instances is obtained. The content 216 is segmented based on categories of objects displayed within the immersive environment. In an embodiment, the scene may be an image and by segmentation, the scene is broken into plurality of subgroups which are referred to as the plurality of segments 218. In an embodiment, the content segmenting module 202 may implement segmentation techniques, which include but are not limited to threshold-based segmentation, edge-based segmentation, region-based segmentation, clustering-based segmentation and artificial neural network-based segmentation. One or more of the segmentation techniques may be implemented to segment the content 216 for obtaining the plurality of segments. In an embodiment, one or more segmenting techniques, known to a person skilled in the art, may be implemented to segment the content 216. In an embodiment, the segmentation technique is configured to output the plurality of segments based on the categories of objects displayed within the immersive environment.

Figure 3B:
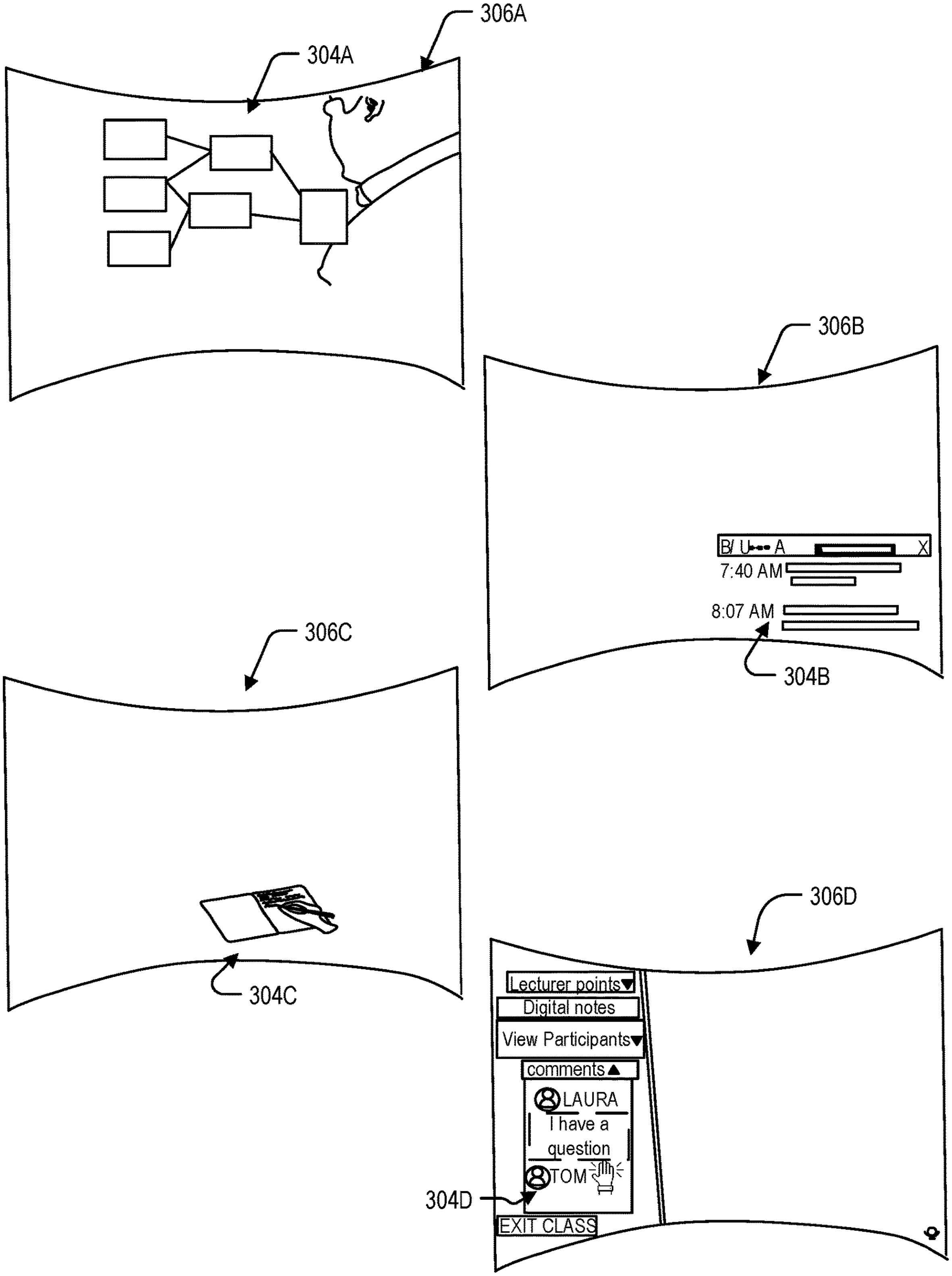

In an embodiment, the categories of the objects may be pre-defined by a user associated with the immersive environment. In an embodiment, the user may be the presenter or the host amongst the plurality of users 106. In an embodiment, the categories 220 may be determined dynamically by the processing unit 102, based on the scene displayed to the user. One or more techniques, known to a person skilled in the art, may be used to dynamically determine the categories 220. In the scene 302A illustrated in FIG. 3A, the categories of objects may be determined to be a first category 304A, a second category 304B, a third category 304C, and a fourth category 304D. The first category 304A may be related to main objects which are associated with content displayed in the immersive environment. For example, for a classroom scenario, the first category 304A may be of object representing the lecture of the lecturer. The second category 304B may be related to objects representing user inputs provided by the user real-time, within the immersive environment. In the scene 302A illustrated in FIG. 3A, the second category 304B may be digital notes that are inputted by the user. The third category 304C may be related to objects of the physical environment surrounding the immersive environment. In the scene 302A illustrated in FIG. 3A, the third category 304C may be physical notes that are written by the user in the physical environment of the user. The fourth category 304D may be related to objects representing user inputs provided by other participants within the immersive environment. In the scene 302A illustrated in FIG. 3A, the fourth category 304D may be comments or reactions of the other participants. Thus, based on the categories of the objects, the scene 302A may be segmented to plurality of segments 218 as shown in FIG. 3B. The plurality of segments 218 include a first segment 306A, a second segment 306B, a third segment 306C and a fourth segment 306D.

Figure 3C:
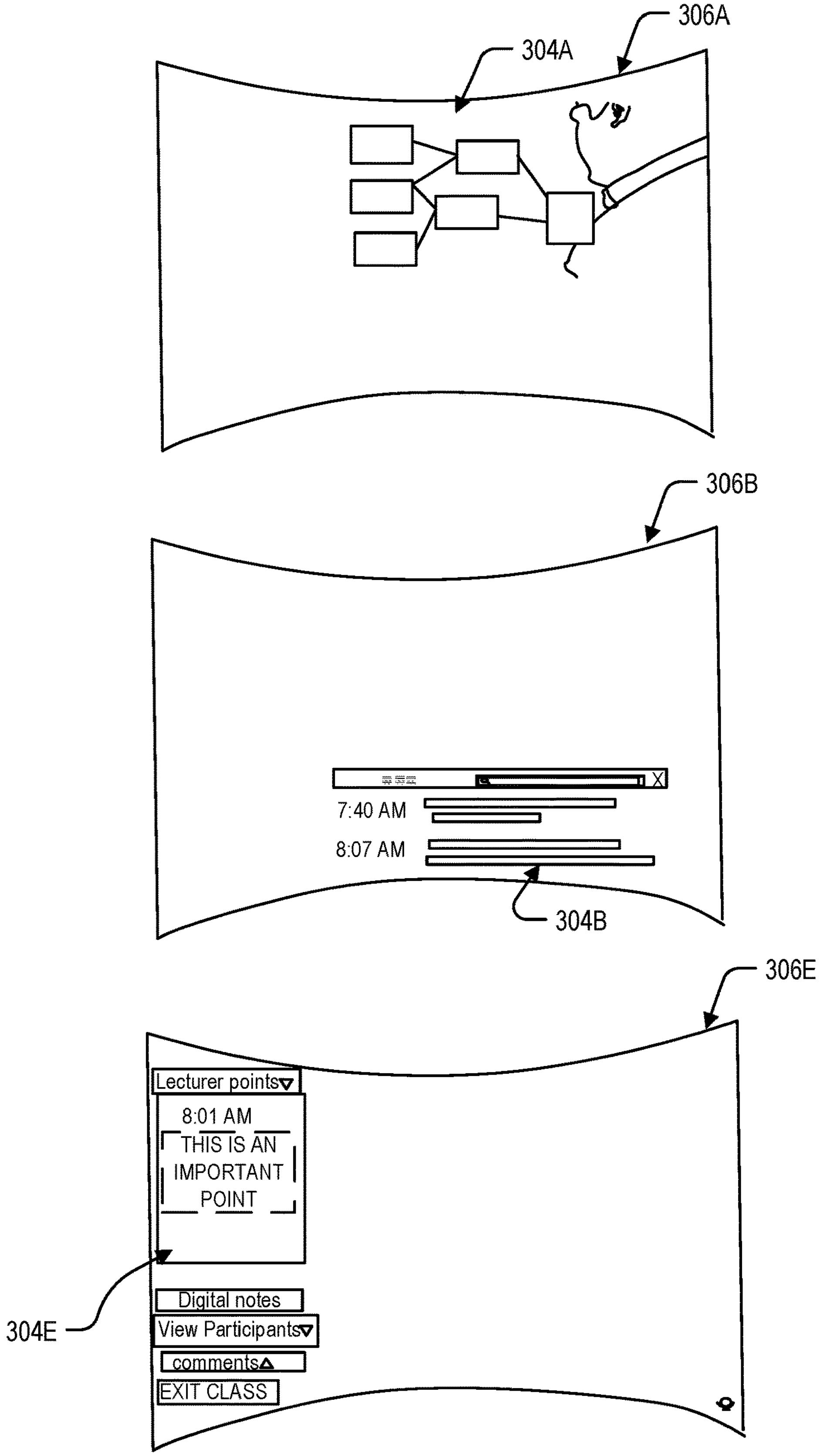

Further, the perspective selecting module 204, may be configured to select a first perspective of a participant from the plurality of participants, for each segment amongst the plurality of segments at an instant from the plurality of instances 218. The first perspective is selected based on at least one of contextual data associated with the immersive environment, preference of a user amongst the plurality of participants, behavior, and inputs of the user within the immersive environment during the live rendering (together referred to as contextual data 224). In an embodiment, the first perspective selected for the plurality of segments 306A, 306B, and 306E is shown in FIG. 3C. For example, consider the user prefers to view lecturer notes rather than other participant's input. Thus, perspective with object 304E shown in a segment 306E may be selected for the fourth segment 304D. Consider, physical notes are not noted in the immersive environment. Thus, the perspective for the third segment 304C may be eliminated.

Figure 3D:
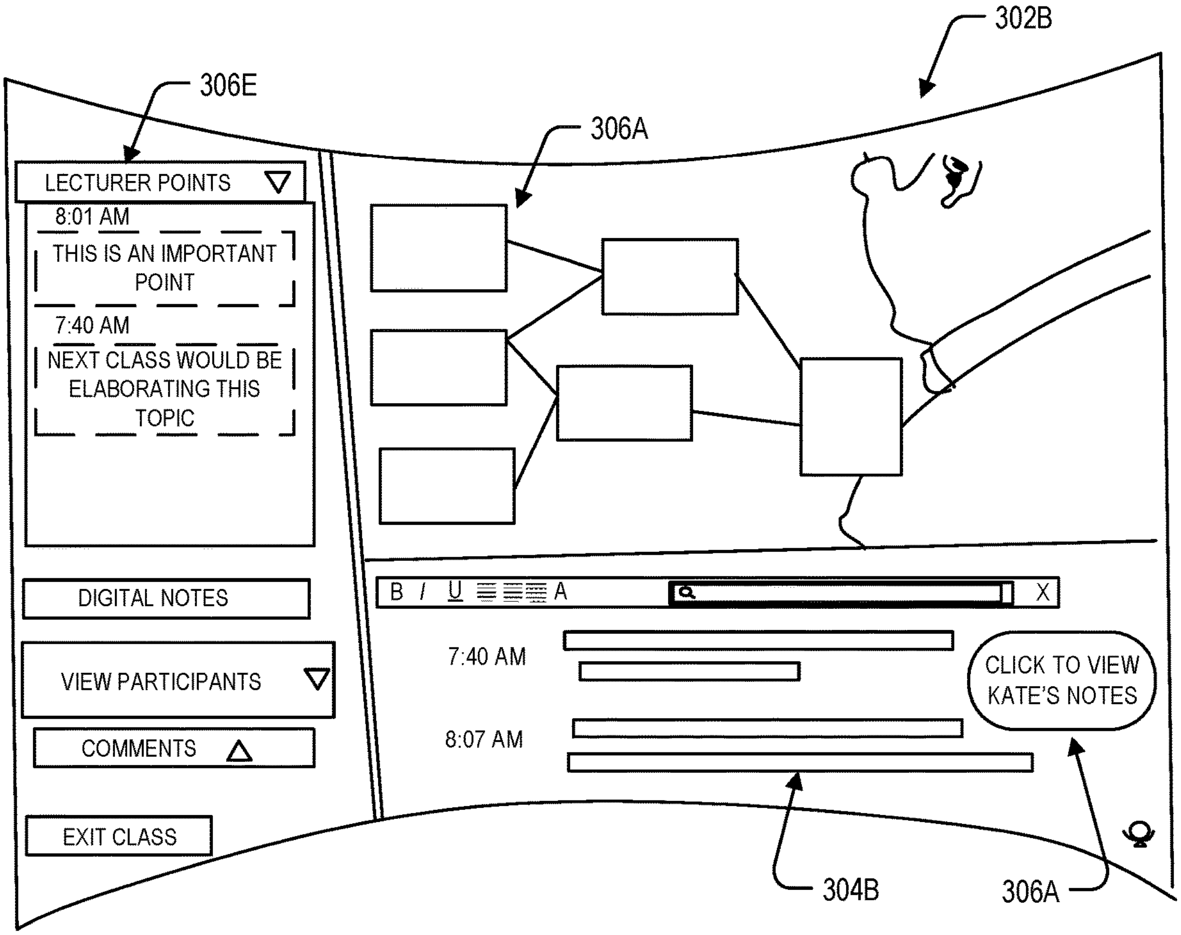

Upon selecting the first perspective, the recording module 206 may be configured to record the first perspective of the plurality of segments during the live rendering. The first perspective of the plurality of segments is recorded to output a portion of a personalized recorded version 226 of the content at the instant of time. The content creation module 208, upon end of the live rendering, may be configured to create the personalized recorded version 226 of the content for the user using the first perspective of the plurality of segments. In an embodiment, the personalized recorded version 226 is created by concatenating the first perspective of each segment from the plurality of segments, to obtain a portion of the personalized recorded version 226 at the instant associated with the plurality of segments. FIG. 3D shows an exemplary representation of a portion 302B obtained for the scene 302A. Portions obtained for each instant from the plurality of instances are combined to output the personalized recorded version 226 of the content.

Figure 3E:
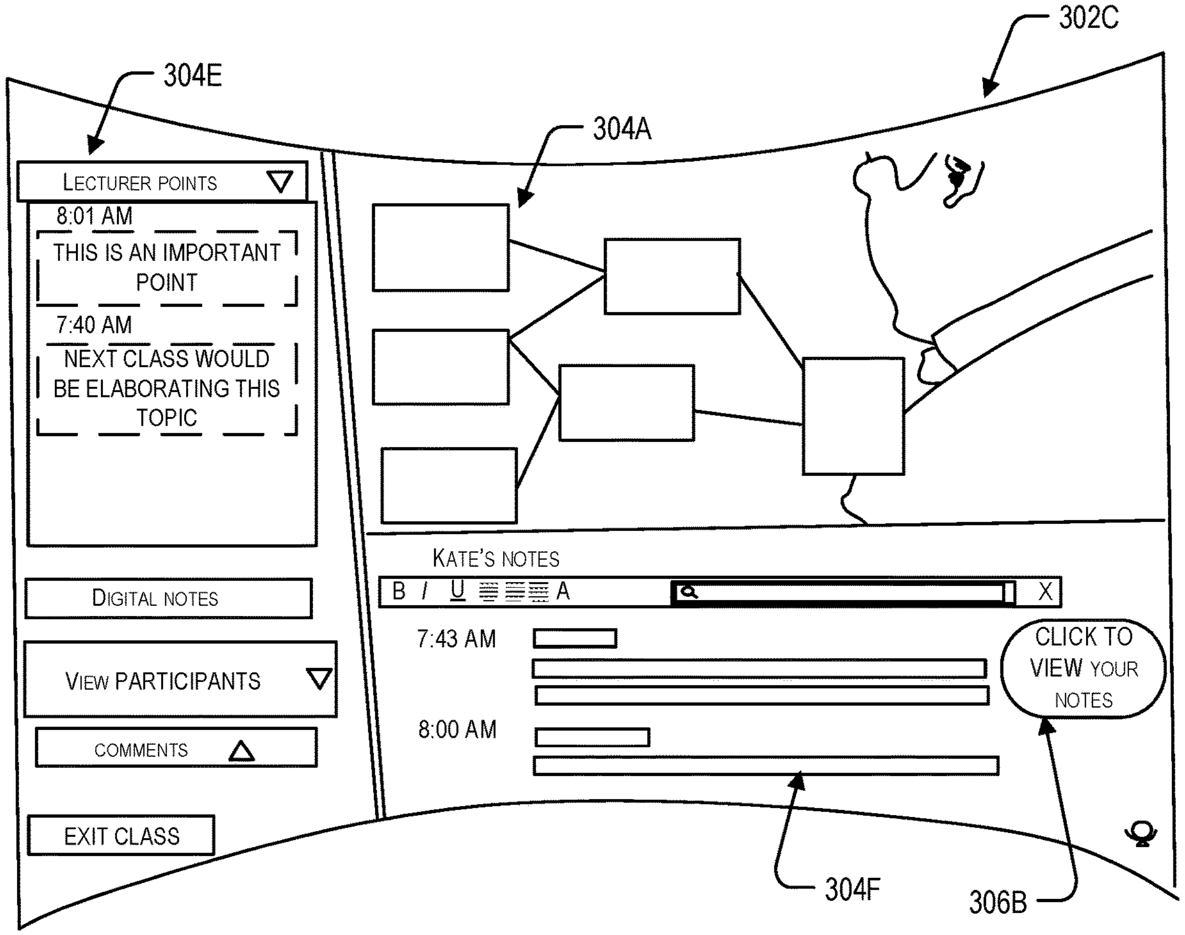

During the live rendering of the content, the recommendation generation module 210 may be further configured to generate one or more real-time recommendations 228 for at least one portion amongst the portions of the personalized recorded version 226, based on the preferences of the user. Further, the one or more real-time recommendations 228 are dynamically displayed along with the content to the user. The one or more real-time recommendations 228 prompt the user to select a second perspective for at least one segment amongst the plurality of segments of the at least one portion. In an embodiment, when the user selects the second perspective, the first perspective of the at least one segment is replaced with the second perspective, for the recording. In an embodiment, information related to the first perspective and the second perspective may be stored as the perspective data 222 in the memory 118. For example, consider the user prefers to view notes of another participant. FIG. 3D shows an exemplary representation of displaying of a recommendation 306A. When the user selects the recommendation 306A, first perspective is modified to present the user with second perspective as shown in scene 302C of FIG. 3E. In the second perspective, object 304B is replaced with object 304F. In the scene 302C, another recommendation 306B may be displayed to the user.

Upon creating the personalized recorded version, the access enabling module 212 may be further configured to enable access to the user for at least one of downloading and sharing the personalized recorded version.

The other data 230 may comprise data, including temporary data and temporary files, generated by modules for performing the various functions of the processing unit 102. The one or more modules 116 may also include other modules 212 to perform various miscellaneous functionalities of the processing unit 102. It would be appreciated that such modules may be represented as a single module or a combination of different modules.

Some non-limiting embodiments or aspects of the present disclosure focus to enable personalized recording of the content based on contextual data, preferences and inputs or behaviors of the user.

Some non-limiting embodiments or aspects of the present disclosure provides to record the personalized version of the content by considering other participants perspective as well.

Some non-limiting embodiments or aspects of the present disclosure teaches to change the perspective dynamically without the need of explicit inputs from the user.

Figure 4:
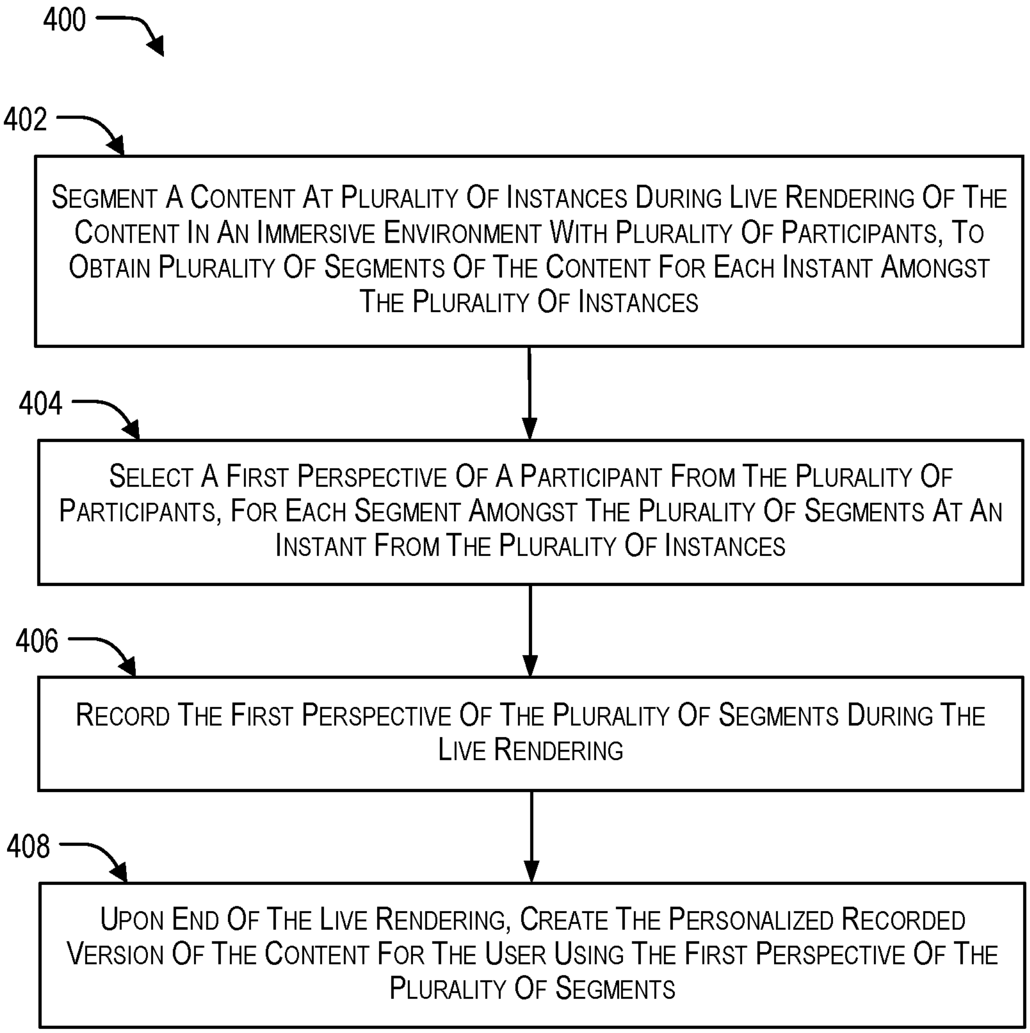
FIG. 4 is an exemplary process of processing unit for enabling personalized recording of a content in an immersive environment, in accordance with an embodiment of the present invention.

FIG. 4 shows an exemplary process of a processing unit 102 for enabling personalized recording of a content in an immersive environment, in accordance with an embodiment of the present disclosure. Process 400 for enabling the personalized recording includes steps coded in form of executable instructions to be executed by a processing unit associated with the immersive environment.

At block 402, the processing unit may be configured to segment a content at plurality of instances during live rendering of the content in an immersive environment with plurality of participants. By segmenting the content, plurality of segments of the content for each instant amongst the plurality of instances is obtained. The content is segmented based on categories of objects displayed within the immersive environment.

At block 404, the processing unit may be configured to select a first perspective of a participant from the plurality of participants, for each segment amongst the plurality of segments at an instant from the plurality of instances. The first perspective is selected based on at least one of contextual data associated with the immersive environment, preference of a user amongst the plurality of participants, behavior, and inputs of the user within the immersive environment during the live rendering.

At block 406, the processing unit may be configured to record the first perspective of the plurality of segments during the live rendering. The first perspective of the plurality of segments is recorded to output a portion of a personalized recorded version of the content at the instant of time.

At block 408, upon end of the live rendering, the processing unit may be configured to create the personalized recorded version of the content for the user using the first perspective of the plurality of segments. In an embodiment, the personalized recorded version is created by concatenating the first perspective of each segment from the plurality of segments, to obtain a portion of the personalized recorded version at the instant associated with the plurality of segments. Further, portions obtained for each instant from the plurality of instances are combined to output the personalized recorded version of the content.

In an embodiment, during the live rendering of the content, the processing unit is further configured to generate one or more real-time recommendations for at least one portion amongst the portions of the personalized recorded version, based on the preferences of the user. Further, the one or more real-time recommendations are dynamically displayed along with the content to the user. The one or more real-time recommendations prompt the user to select a second perspective for at least one segment amongst the plurality of segments of the at least one portion. In an embodiment, when the user selects the second perspective, the first perspective of the at least one segment is replaced with the second perspective, for the recording.

In an embodiment, upon creating the personalized recorded version, the processing unit is further configured to enable access to the user for at least one of downloading and sharing the personalized recorded version.

As illustrated in FIG. 4, the method 400 may include one or more steps for executing processes in the processing unit 102. The method 400 may be described in the general context of computer-executable instructions. Generally, computer-executable instructions can include routines, programs, objects, components, data structures, procedures, modules, and functions, which perform particular functions or implement particular abstract data types.

The order in which steps in method 400 are described may not intended to be construed as a limitation, and any number of the described method steps can be combined in any order to implement the method. Additionally, individual steps may be deleted from the methods without departing from the scope of the subject matter described herein. Furthermore, the method can be implemented in any suitable hardware, software, firmware, or combination thereof.

Figure 5:
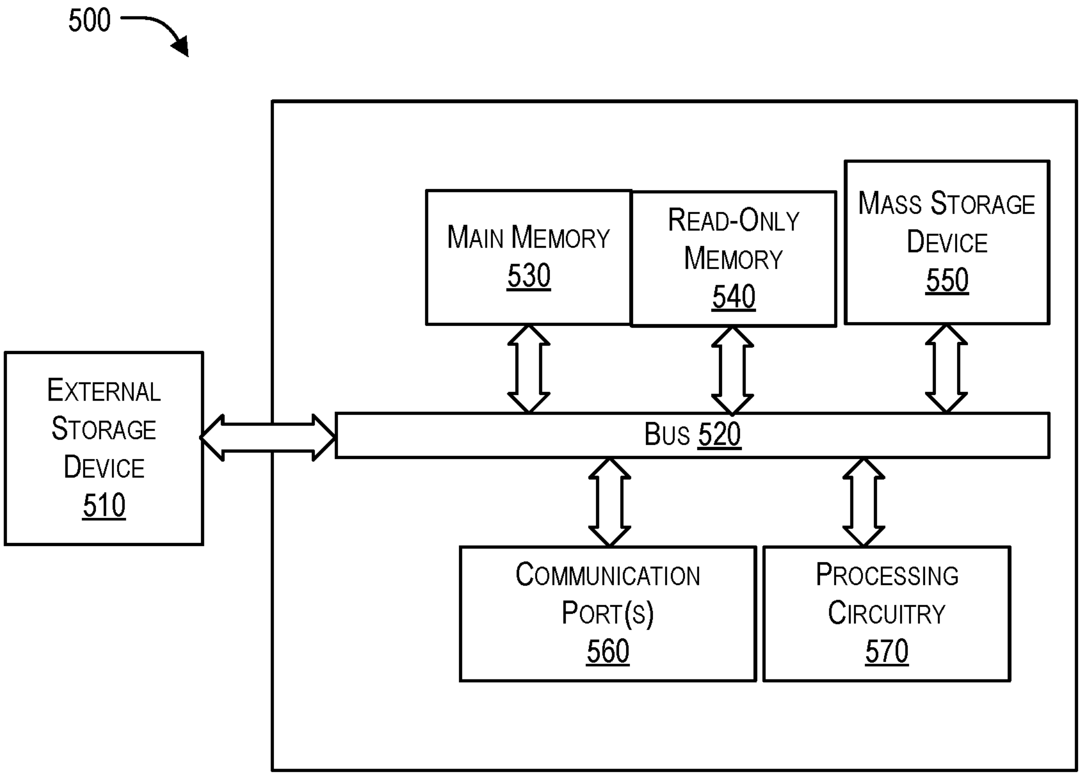
FIG. 5 illustrates an exemplary computer unit in which or with which embodiments of the present invention may be utilized.

FIG. 5 illustrates an exemplary computer system in which or with which embodiments of the present invention may be utilized. Depending upon the particular implementation, the various process and decision blocks described above may be performed by hardware components, embodied in machine-executable instructions, which may be used to cause a general-purpose or special-purpose processor programmed with the instructions to perform the steps or the steps may be performed by a combination of hardware, software and/or firmware. As shown in FIG. 5, the computer system 500 includes an external storage device 510, bus 520, main memory 530, read-only memory 540, mass storage device 550, communication port(s) 560, and processing circuitry 570.

Those skilled in the art will appreciate that the computer system 500 may include more than one processing circuitry 570 and one or more communication ports 560. The processing circuitry 570 should be understood to mean circuitry based on one or more microprocessors, microcontrollers, digital signal processors, programmable logic devices, Field-Programmable Gate Arrays (FPGAs), Application-Specific Integrated Circuits (ASICs), etc., and may include a multi-core processor (e.g., dual-core, quadcore, Hexa-core, or any suitable number of cores) or supercomputer. In some embodiments, the processing circuitry 570 is distributed across multiple separate processors or processing units, for example, multiple of the same type of processing units (e.g., two Intel Core i7 processors) or multiple different processors (e.g., an Intel Core i5 processor and an Intel Core i7 processor). Examples of the processing circuitry 570 include but are not limited to, an Intel® Itanium® or Itanium 2 processor(s), AMD® Opteron® or Athlon MP® processor (s), Motorola® lines of processors, System on Chip (SoC) processors or other future processors. The processing circuitry 570 may include various modules associated with embodiments of the present disclosure.

The communication port 560 may include a cable modem, Integrated Services Digital Network (ISDN) modem, a Digital Subscriber Line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of electronic devices or communication of electronic devices in locations remote from each other. The communication port 560 may be any RS-232 port for use with a modem-based dialup connection, a 10/100 Ethernet port, a Gigabit, or a 10 Gigabit port using copper or fiber, a serial port, a parallel port, or other existing or future ports. The communication port 560 may be chosen depending on a network, such as a Local Area Network (LAN), Wide Area Network (WAN), or any network to which the computer system 500 may be connected.

The main memory 530 may include Random Access Memory (RAM) or any other dynamic storage device commonly known in the art. Read-only memory (ROM) 540 may be any static storage device(s), e.g., but not limited to, a Programmable Read-Only Memory (PROM) chips for storing static information, e.g., start-up or BIOS instructions for the processing circuitry 570.

The mass storage device 550 may be an electronic storage device. As referred to herein, the phrase "electronic storage device" or "storage device" should be understood to mean any device for storing electronic data, computer software, or firmware, such as random-access memory, read-only memory, hard drives, optical drives, Digital Video Disc (DVD) recorders, Compact Disc (CD) recorders, BLU-RAY disc (BD) recorders, BLU-RAY 3D disc recorders, Digital Video Recorders (DVRs, sometimes called a personal video recorder or PVRs), solid-state devices, quantum storage devices, gaming consoles, gaming media, or any other suitable fixed or removable storage devices, and/or any combination of the same. Nonvolatile memory may also be used (e.g., to launch a boot-up routine and other instructions). Cloud-based storage may be used to supplement the main memory 530. The mass storage device 550 may be any current or future mass storage solution, which may be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firmware interfaces), e.g., those available from Seagate (e.g., the Seagate Barracuda 7200 family) or Hitachi (e.g., the Hitachi Deskstar 7K1000), one or more optical discs, Redundant Array of Independent Disks (RAID) storage, e.g., an array of disks (e.g., SATA arrays), available from various vendors including Dot Hill Systems Corp., LaCie, Nexsan Technologies, Inc. and Enhance Technology, Inc.

The bus 520 communicatively couples the processing circuitry 570 with the other memory, storage, and communication blocks. The bus 520 may be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects processing circuitry 570 to the software system.

Optionally, operator and administrative interfaces, e.g., a display, keyboard, and a cursor control device, may also be coupled to the bus 520 to support direct operator interaction with the computer system 500. Other operator and administrative interfaces may be provided through network connections connected through the communication port(s) 560. The external storage device 510 may be any kind of external hard drives, floppy drives, IOMEGA® Zip Drives, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned exemplary computer system limit the scope of the present disclosure.

The computer system 500 may be accessed through a user interface. The user interface application may be implemented using any suitable architecture. For example, it may be a stand-alone application wholly implemented on the computer system 500. The user interfaces application and/or any instructions for performing any of the embodiments discussed herein may be encoded on computer-readable media. Computer-readable media includes any media capable of storing data. In some embodiments, the user interface application is client-server-based. Data for use by a thick or thin client implemented on electronic device computer system 500 is retrieved on-demand by issuing requests to a server remote to the computer system 500. For example, computer system 500 may receive inputs from the user via an input interface and transmit those inputs to the remote server for processing and generating the corresponding outputs. The generated output is then transmitted to the computer system 500 for presentation to the user.

While embodiments of the present invention have been illustrated and described, it will be clear that the invention is not limited to these embodiments only. Numerous modifications, changes, variations, substitutions, and equivalents, will be apparent to those skilled in the art without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular name.

As used herein, and unless the context dictates otherwise, the term “coupled to” is intended to include both direct coupling (in which two elements that are coupled to each other contact each other) and indirect coupling (in which at least one additional element is located between the two elements). Therefore, the terms “coupled to” and “coupled with” are used synonymously. Within the context of this document, terms “coupled to” and “coupled with” are also used euphemistically to mean “communicatively coupled with” over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms “comprises” and “comprising” should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions, or examples, which are included to enable a person having ordinary skill in the art to make and use the invention when combined with information and knowledge available to the person having ordinary skill in the art.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein but is to be accorded to the widest scope consistent with the principles and novel features disclosed herein. It is contemplated that additional embodiments are within the spirit and true scope of the disclosed subject matter.

What is claimed:

1. A method for enabling personalized recording of a content in an immersive environment, the method comprising:

segmenting, by a processing unit, a content at plurality of instances during live rendering of the content in an immersive environment with plurality of participants, to obtain plurality of segments of the content for each instant amongst the plurality of instances, wherein the content is segmented based on categories of objects displayed within the immersive environment;

selecting, by the processing unit, a first perspective of a participant from the plurality of participants, for each segment amongst the plurality of segments at an instant from the plurality of instances, wherein the first perspective is selected based on at least one of contextual data associated with the immersive environment, preference of a user amongst the plurality of participants, behavior, and inputs of the user within the immersive environment during the live rendering;

recording, by the processing unit, the first perspective of the plurality of segments during the live rendering; and upon end of the live rendering, creating, by the processing unit, the personalized recorded version of the content for the user using the first perspective of the plurality of segments.

2. The method of claim 1, further comprises, upon creating the personalized recorded version:

enabling, by the processing unit, access to the user for at least one of downloading and sharing the personalized recorded version.

3. The method of claim 1, wherein the first perspective of the plurality of segments is recorded to output a portion of a personalized recorded version of the content at the instant of time.

4. The method of claim 3, wherein creating the personalized recorded version comprises:

concatenating, by the processing unit, the first perspective of each segment from the plurality of segments, to obtain a portion of the personalized recorded version at the instant associated with the plurality of segments; and combining, by the processing unit, portions obtained for each instant from the plurality of instances, to output the personalized recorded version of the content.

5. The method of claim 1, further comprises, during live rendering of the content:

generating, by the processing unit, one or more real-time recommendations for at least one portion amongst the portions of the personalized recorded version, based on the preferences of the user; and dynamically displaying, by the processing unit, the one or more real-time recommendations along with the content to the user, wherein the one or more real-time recommendations prompt the user to select a second perspective for at least one segment amongst the plurality of segments of the at least one portion.

6. The method of claim 5, further comprises, when the user selects the second perspective:

replacing, by the processing unit, the first perspective of the at least one segment with the second perspective, for the recording.

7. A processing unit for enabling personalized recording of a content in an immersive environment, the processing unit comprises:

one or more processors; and a memory communicatively coupled to the one or more processors, wherein the memory stores processor-executable instructions, which, on execution, cause the one or more processors to:

segment a content at plurality of instances during live rendering of the content in an immersive environment with plurality of participants, to obtain plurality of segments of the content for each instant amongst the plurality of instances, wherein the content is segmented based on categories of objects displayed within the immersive environment;

select a first perspective of a participant from the plurality of participants, for each segment amongst the plurality of segments at an instant from the plurality of instances, wherein the first perspective is selected based on at least one of contextual data associated with the immersive environment, preference of a user amongst the plurality of participants, behavior and inputs of the user within the immersive environment during the live rendering;

record the first perspective of the plurality of segments during the live rendering; and upon end of the live rendering, create the personalized recorded version of the content for the user using the first perspective of the plurality of segments.

8. The processing unit of claim 7, further comprises the processing unit to, upon creating the personalized recorded version:

enable access to the user for at least one of downloading and sharing the personalized recorded version.

9. The processing unit of claim 7, wherein the first perspective of the plurality of segments is recorded to output a portion of a personalized recorded version of the content at the instant of time.

10. The processing unit of claim 9, wherein creating the personalized recorded version comprises:

concatenating, by the processing unit, the first perspective of each segment from the plurality of segments, to obtain a portion of the personalized recorded version at the instant associated with the plurality of segments; and combining, by the processing unit, portions obtained for each instant from the plurality of instances, to output the personalized recorded version of the content.

11. The processing unit of claim 7, further comprises the processing unit configures to, during live rendering of the content:

generate one or more real-time recommendations for at least one portion amongst the portions of the personalized recorded version, based on the preferences of the user; and dynamically display the one or more real-time recommendations along with the content to the user, wherein the one or more real-time recommendations prompt the user to select a second perspective for at least one segment amongst the plurality of segments of the at least one portion.

12. The processing unit of claim 11, further comprises, when the user selects the second perspective:

replacing, by the processing unit, the first perspective of the at least one segment with the second perspective, for the recording.

13. A non-transitory computer-readable medium including instructions stored thereon that when processed by one or more processors cause a system to perform operations comprising:

segmenting a content at plurality of instances during live rendering of the content in an immersive environment with plurality of participants, to obtain plurality of segments of the content for each instant amongst the plurality of instances, wherein the content is segmented based on categories of objects displayed within the immersive environment;

selecting a first perspective of a participant from the plurality of participants, for each segment amongst the plurality of segments at an instant from the plurality of instances, wherein the first perspective is selected based on at least one of contextual data associated with the immersive environment, preference of a user amongst the plurality of participants, behavior and inputs of the user within the immersive environment during the live rendering;

recording the first perspective of the plurality of segments during the live rendering; and upon end of the live rendering, creating the personalized recorded version of the content for the user using the first perspective of the plurality of segments.

14. The non-transitory computer-readable medium of claim 13, further comprises, upon creating the personalized recorded version:

enabling access to the user for at least one of downloading and sharing the personalized recorded version.

15. The non-transitory computer-readable medium of claim 14, wherein the first perspective of the plurality of segments is recorded to output a portion of a personalized recorded version of the content at the instant of time.

16. The non-transitory computer-readable medium of claim 13, wherein creating the personalized recorded version comprises:

concatenating the first perspective of each segment from the plurality of segments, to obtain a portion of the personalized recorded version at the instant associated with the plurality of segments; and combining portions obtained for each instant from the plurality of instances, to output the personalized recorded version of the content.

17. The non-transitory computer-readable medium of claim 13, further comprises, during live rendering of the content:

generating one or more real-time recommendations for at least one portion amongst the portions of the personalized recorded version, based on the preferences of the user; and dynamically displaying the one or more real-time recommendations along with the content to the user, wherein the one or more real-time recommendations prompt the user to select a second perspective for at least one segment amongst the plurality of segments of the at least one portion.

18. The non-transitory computer-readable medium of claim 17, further comprises, when the user selects the second perspective:

replacing the first perspective of the at least one segment with the second perspective, for the recording.

* * * * *